United States Patent
Leung (10) Patent No.: US 7,715,191 B2
(45) Date of Patent: May 11, 2010

(54) HANDHELD ELECTRONIC COMMUNICATION DEVICE TRANSITIONABLE BETWEEN COMPACT AND EXPANDED CONFIGURATIONS

(75) Inventor: Kwok Ching Leung, Richmond Hill (CA)

(73) Assignee: Research in Motion Limited, Waterloo, Ontario (CA)

( * ) Notice: Subject to any disclaimer, the term of this patent is extended or adjusted under 35 U.S.C. 154(b) by 0 days.

(21) Appl. No.: 12/098,939

(22) Filed: Apr. 7, 2008

(65) Prior Publication Data

US 2009/0251854 A1    Oct. 8, 2009

(51) Int. Cl.
    *G06F 1/16*    (2006.01)
(52) U.S. Cl. ............................................. 361/679.56
(58) Field of Classification Search .................. 361/679, 361/680, 683, 679.55, 679.56; 455/575.4
    See application file for complete search history.

(56) References Cited

U.S. PATENT DOCUMENTS

| | | | |
|---|---|---|---|
| 6,477,040 B2 * | 11/2002 | Horiki ......................... | 361/683 |
| 6,829,139 B1 * | 12/2004 | Duarte .................. | 361/679.02 |
| 7,006,015 B2 * | 2/2006 | England ...................... | 341/22 |
| 7,042,711 B2 * | 5/2006 | Tanaka et al. ............ | 361/679.1 |
| 7,082,028 B2 * | 7/2006 | Huilgol et al. ......... | 361/679.07 |
| 7,092,246 B2 * | 8/2006 | Tanaka et al. .......... | 361/679.27 |
| 7,158,818 B2 * | 1/2007 | Lee .......................... | 455/575.4 |
| 7,200,429 B2 * | 4/2007 | Park et al. ................. | 455/575.4 |
| 7,221,560 B2 * | 5/2007 | Varela ........................ | 361/680 |
| 7,376,450 B2 * | 5/2008 | Chen ....................... | 455/575.4 |
| 2003/0132863 A1 * | 7/2003 | Lahr ........................... | 341/22 |
| 2005/0105252 A1 * | 5/2005 | Tanaka et al. ............... | 361/679 |
| 2006/0146014 A1 * | 7/2006 | Lehtonen ..................... | 345/156 |
| 2006/0223596 A1 * | 10/2006 | Hur .......................... | 455/575.4 |
| 2007/0153452 A1 * | 7/2007 | Harmon et al. ............. | 361/679 |
| 2007/0153457 A1 * | 7/2007 | Hosoya et al. .............. | 361/681 |
| 2007/0254730 A1 * | 11/2007 | Kim et al. ................. | 455/575.4 |
| 2008/0076493 A1 * | 3/2008 | Seo et al. .................. | 455/575.4 |
| 2008/0180892 A1 * | 7/2008 | Lai ............................. | 361/680 |
| 2008/0186663 A1 * | 8/2008 | Chen .......................... | 361/681 |
| 2008/0188269 A1 * | 8/2008 | Jin et al. ..................... | 455/566 |
| 2008/0242380 A1 * | 10/2008 | Kajihara et al. .......... | 455/575.4 |

FOREIGN PATENT DOCUMENTS

| | | |
|---|---|---|
| EP | 1773029 | 4/2007 |
| EP | 1814285 | 8/2007 |
| EP | 1906631 | 4/2008 |

OTHER PUBLICATIONS

Search Report of European App. No. 08154172.4, dated Oct. 8, 2008.

* cited by examiner

*Primary Examiner*—Lisa Lea-Edmonds
(74) *Attorney, Agent, or Firm*—Novak Druce + Quigg LLP (57) ABSTRACT

A handheld electronic communication device that is transitionable between compact and expanded configurations is disclosed. The device includes a display panel positioned adjacent and parallel to a keyboard panel in the compact configuration. The display panel and keyboard panel are coupled together by one or more connectors. In at least one embodiment, the at least one connector enables relative x and z direction motion between the panels, while maintaining them in parallel. In at least one other possible embodiment the display panel can be shifted sideways from the keyboard to expose one or more keys. This other at least one possible embodiment is particularly useful when the device is used as a multimedia player and it is undesirable to expose the entire keyboard panel.

17 Claims, 12 Drawing Sheets

HANDHELD ELECTRONIC COMMUNICATION DEVICE TRANSITIONABLE BETWEEN COMPACT AND EXPANDED CONFIGURATIONS

FIELD

The present disclosure pertains generally to a handheld electronic device that has communication capabilities. In particular, the present disclosure relates to a handheld electronic communication device that is capable of transitioning between compact and expanded configurations.

BACKGROUND

With the proliferation of communication systems, compatible handheld communication devices are becoming more prevalent, as well as advanced. Examples of communication devices include both handheld communication devices as well as larger devices such as laptop computers, desktop computers and the like. These devices are capable of sending and receiving a variety of different messages including but not limited to short message service (SMS), multimedia message service (MMS), emails, voice messages, and the like.

Whereas in the past such handheld communication devices typically accommodated either voice transmission (cell phones), or text transmission (pagers and PDAs), today's consumer often demands a combination device capable of performing both types of transmissions, including even sending and receiving e-mail. Furthermore, these higher-performance devices can also be capable of sending and receiving other types of data including that which allows the viewing and use of Internet websites. These higher level functionalities necessarily require greater user interaction with the devices through included user interfaces (UIs) which may have originally been designed to accommodate making and receiving telephone calls and sending messages over a related Short Messaging Service (SMS). As might be expected, suppliers of such mobile communication devices and the related service providers are anxious to meet these customer requirements, but the demands of these more advanced functionalities have in many circumstances rendered the traditional user interfaces unsatisfactory, a situation that has caused designers to have to improve the UIs through which users input information and control these sophisticated operations.

Keyboards are used on many handheld devices, including telephones and mobile communication devices. The size of keyboards has been reduced over the years, as newer, smaller devices have become popular. Cell phones, for example, are now sized to fit in one's pocket or the palm of the hand. As the size of the devices has decreased, the more important it has become to utilize the entire keyboard surface as efficiently as possible.

Many keyboards on mobile devices have an input device for navigation through the graphical user interface. These interfaces include such devices as trackballs and rotating wheels which can be used to affect movement of a cursor or pointer, or to scroll up, down and about a displayed page. These navigation devices often occupy a relatively large amount of space on the incorporating mobile device. Because the navigation device is frequently used and often requires fine control, a lower end size limitation will normally be observed by device designers. To accommodate such larger, more convenient navigation devices on the housing of the mobile device, the amount of space that is available for the keys of the keyboard is correspondingly reduced if the keyboard and navigational device are proximately located to one another.

BRIEF DESCRIPTION OF THE DRAWINGS

Exemplary and arrangements configured according to the advantageous solutions presented herein are depicted in the accompanying drawings wherein.

DETAILED DESCRIPTION

Figure 1A:
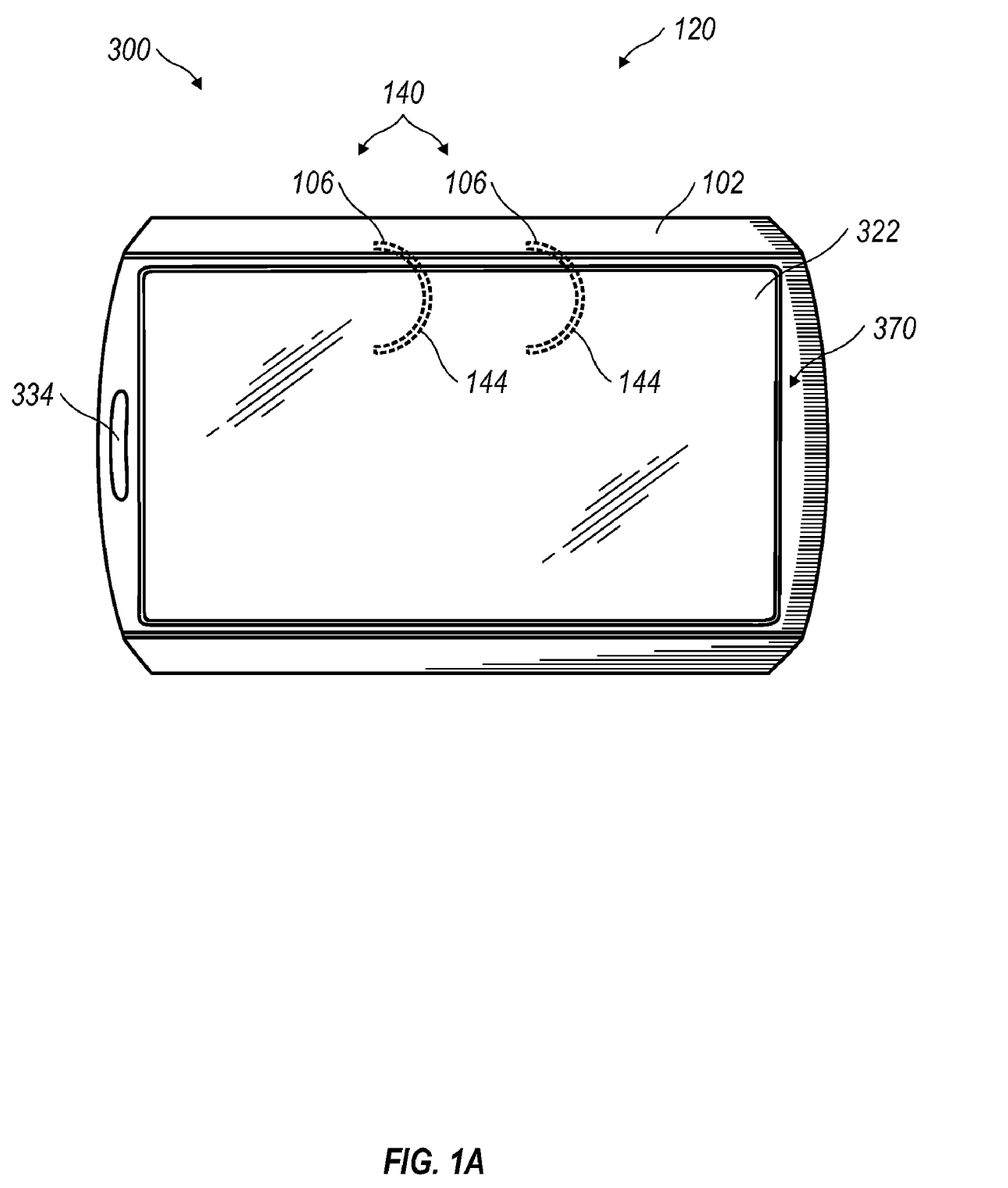
FIG. 1A illustrates an exemplary handheld electronic communication device in a compact configuration.
Figure 6:
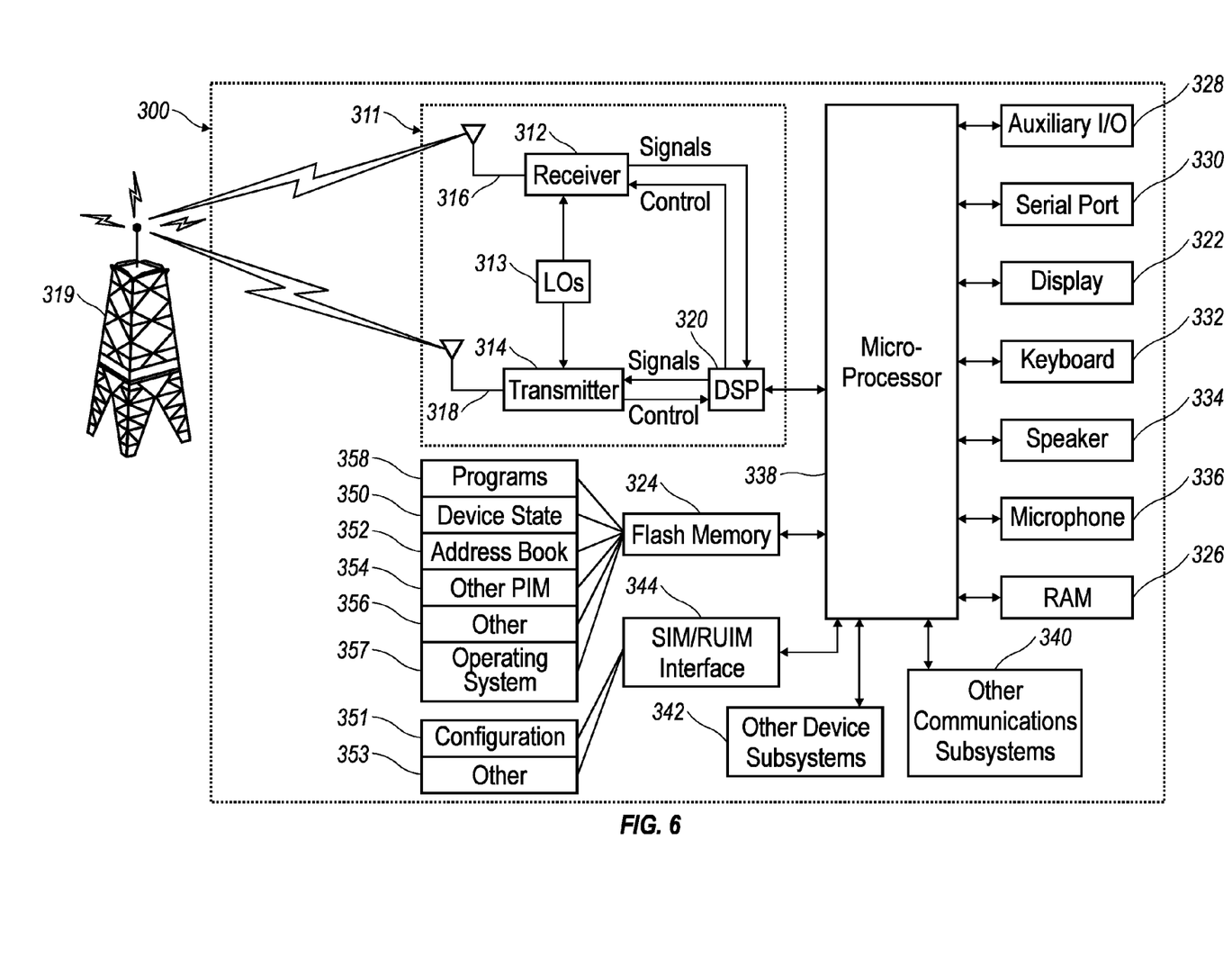
FIG. 6 is a block diagram representing a wireless handheld communication device interacting in a communication network.

An exemplary handheld electronic device 300 such as is shown in FIG. 1A and the device's cooperation in a wireless network 319 are exemplified in the block diagram of FIG. 6. These figures are exemplary only, and those persons skilled in the art will appreciate the additional elements and modifications necessary to make the handheld electronic communication device 300 work in particular network environments. While in the illustrated embodiment the handheld electronic communication device 300 is a handheld wireless communication device, in other embodiments, the handheld electronic communication device 300 can be a personal digital assistant (PDA) or the like.

As shown in the block diagram of FIG. 6, the handheld electronic communication device 300 includes a microprocessor 338 that controls the operation of the handheld electronic communication device 300. A communication subsystem 311 performs all communication transmission and reception with the wireless network 319. Additionally, in at least one embodiment, the microprocessor 338 can be connected to a serial port (for example, a Universal Serial Bus port) 330 which can allow for communication with other devices or systems via the serial port 300. A display 322 can be connected to microprocessor 338 to allow for displaying of information to an operator of the device. When the handheld electronic communication device 300 is equipped with a keyboard 332, the keyboard can also be connected with the microprocessor 338. The handheld electronic communication device 300 can include a speaker 334, a microphone, 336, random access memory (RAM) 326, and flash memory 324 all of which may be connected to the microprocessor 338.

Other similar components may be provided on the handheld electronic communication device 300 as well and optionally connected to the microprocessor 338. Other communication subsystems 340 and other communication device subsystems 342 are generally indicated as being functionally connected with the microprocessor 338 as well. An example of a communication subsystem 340 is a short range communication system such as BLUETOOTH® communication module or a WI-FI® communication module (a communication module in compliance with IEEE 802.11b) and associated circuits and components. Additionally, the microprocessor 338 is able to perform operating system functions and enables execution of programs on the handheld electronic communication device 300. In some embodiments, not all of the above components may be included in the handheld electronic communication device 300. For example, in at least one embodiment the keyboard 332 is not provided as a separate component within the keyboard panel, and is instead integrated with a touchscreen as described below.

Figure 3:
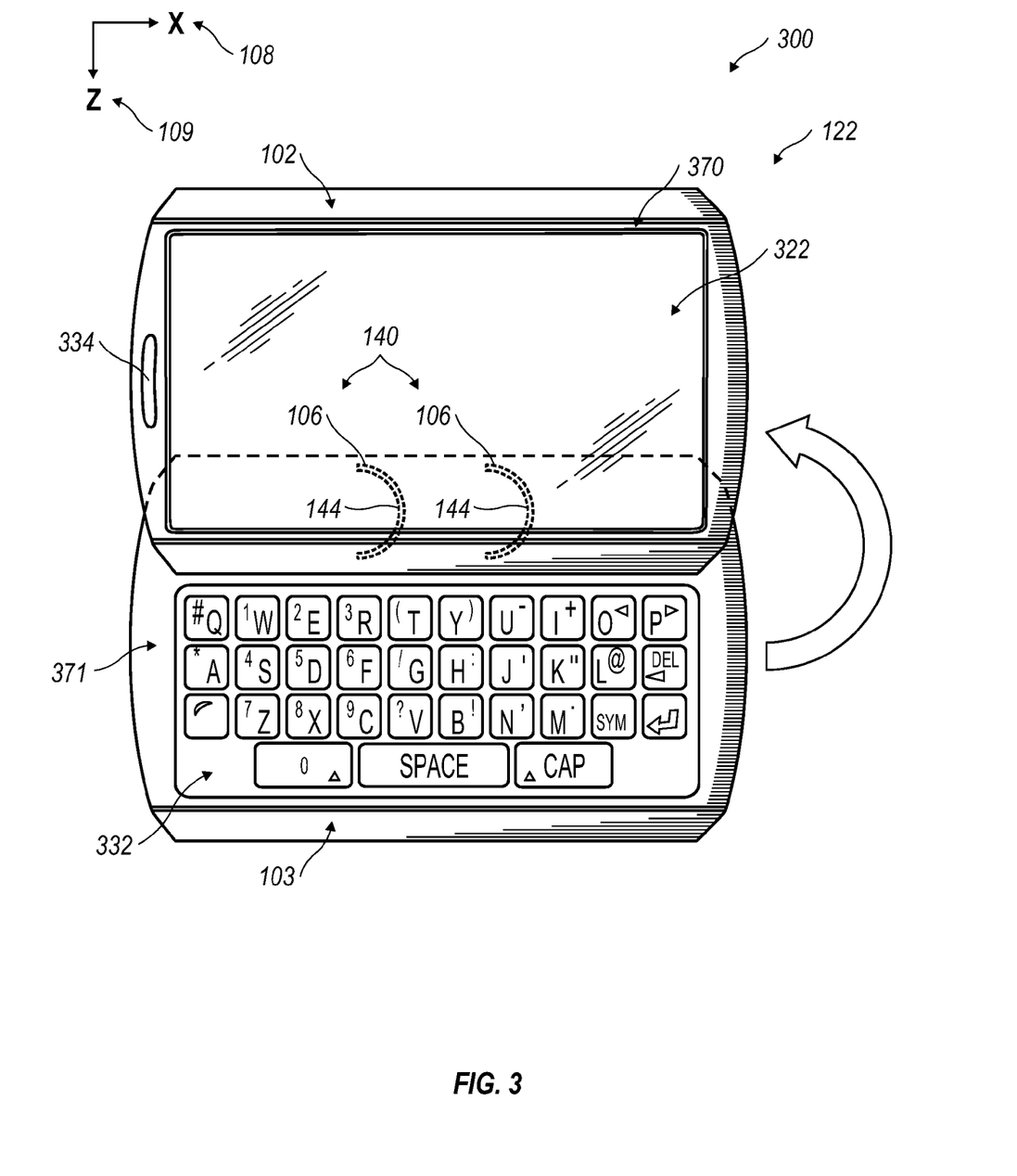
FIG. 3 is front view of an exemplary handheld electronic communication device in an expanded configuration with an oblong display panel offset above an oblong display panel with keys of the keyboard exposed for actuation.

The auxiliary I/O subsystem 328 can take the form of a variety of different navigation tools (multi-directional or single-directional) such as a trackball navigation tool 321 as illustrated in the exemplary embodiment shown in FIG. 3, or a thumbwheel, a navigation pad, a joystick, touch-sensitive interface, or other I/O interface. These navigation tools may be located on the front face 370 of the display panel 102 or may be located on any exterior surface of the handheld electronic communication device 300. Other auxiliary I/O subsystems can include external display devices and externally connected keyboards (not shown). While the above examples have been provided in relation to the auxiliary I/O subsystem 328, other subsystems capable of providing input or receiving output from the handheld electronic communication device 300 are considered within the scope of this disclosure. Additionally, other keys may be placed along the sides of the handheld electronic communication device 300 to function as escape keys, volume control keys, scrolling keys, power switches, or user programmable keys, and may likewise be programmed accordingly.

Furthermore, the handheld electronic communication device 300 can be equipped with components to enable operation of various programs, as shown in FIG. 6. In an exemplary embodiment, the flash memory 324 is enabled to provide a storage location for the operating system 357, device programs 358, and data. The operating system 357 is generally configured to manage other programs 358 that are also stored in memory 324 and executable on the processor 338. The operating system 357 honors requests for services made by programs 358 through predefined program 358 interfaces. More specifically, the operating system 357 typically determines the order in which multiple programs 358 are executed on the processor 338 and the execution time allotted for each program 358, manages the sharing of memory 324 among multiple programs 358, handles input and output to and from other device subsystems 342, and so on. In addition, users can typically interact directly with the operating system 357 through a user interface usually including the keyboard 332 and display screen 322. While in an exemplary embodiment operating system 357 is stored in flash memory 324, the operating system 357 in other embodiments is stored in read-only memory (ROM) or similar storage element (not shown). As those skilled in the art will appreciate, the operating system 357, device program 358 or parts thereof may be loaded in RAM 326 or other volatile memory.

In one exemplary embodiment, the flash memory 324 contains programs 358 for execution on the handheld electronic communication device 300 including an address book 352, a personal information manager (PIM) 354, and the device state 350. Furthermore, programs 358 and other information 356 including data can be segregated upon storage in the flash memory 324 of the handheld electronic communication device 300.

In one exemplary embodiment, the flash memory 324 contains programs for displaying multimedia audio visual data such as, non-exclusively, .avi, .tif, .mpep, .jpeg and the like. These programs can enable an operator to listen to music, watch videos, and other similar multimedia files.

When the handheld electronic communication device 300 is enabled for two-way communication within the wireless communication network 319, it can send and receive signals from a mobile communication service. Examples of communication systems enabled for two-way communication include, but are not limited to, the GPRS (General Packet Radio Service) network, the UMTS (Universal Mobile Telecommunication Service) network, the EDGE (Enhanced Data for Global Evolution) network, the CDMA (Code Division Multiple Access) network, the Evolution Data Only (EV-DO) network, High-Speed Packet Access (HSPA) network, the Universal Mobile Telecommunication Service Time Division Duplexing (UMTS-TDD) network, the Ultra Mobile Broadband (UMB) network, the Worldwide Interoperability for Microwave Access (WiMAX) network, and other networks that can be used for data and voice, or just data or voice. For the systems listed above, the handheld electronic communication device 300 must be properly enabled to transmit and receive signals from the communication network 319. Other systems may not require such identifying information. GPRS and EDGE use a Subscriber Identity Module (SIM) in order to allow communication with the communication network 319. Likewise, most CDMA systems use a Removable Identity Module (RUIM) in order to communicate with the CDMA network. Similarly, UMTS uses a Universal Subscriber Identity Module (USIM) in order to allow communication with the UMTS network. The SIM/RUIM/USIM card can be used in multiple different handheld electronic communication devices 300. The handheld electronic communication device 300 may be able to operate some features without a SIM/RUIM/USIM card, but it will not be able to communicate with the network 319. A SIM/RUIM/USIM interface 344 located within the handheld electronic communication device 300 allows for removal or insertion of a SIM/RUIM/USIM card (not shown). The SIM/RUIM/USIM card features memory and holds key configurations 351, and other information 353 such as identification and subscriber related information. With a properly enabled handheld electronic communication device 300, two-way communication between the handheld electronic communication device 300 and communication network 319 is possible.

If the handheld electronic communication device 300 is enabled as described above or the communication network 319 does not require such enablement, the two-way communication enabled handheld electronic communication device 300 is able to both transmit and receive information from the communication network 319. The transfer of communication can be from the handheld electronic communication device 300 or to the handheld electronic communication device 300. In order to communicate with the communication network 319, the handheld electronic communication device 300 in the presently described exemplary embodiment is equipped with an integral or internal antenna 318 for transmitting signals to the communication network 319. Likewise the handheld electronic communication device 300 in the presently described exemplary embodiment is equipped with another antenna 316 for receiving communication from the communication network 319. These antennae (316, 318) in another exemplary embodiment are combined into a single antenna (not shown). As one skilled in the art would appreciate, the antenna or antennae (316, 318) in other possible embodiments could be externally mounted on the handheld electronic communication device 300.

When equipped for two-way communication, the handheld electronic communication device 300 features a communication subsystem 311. As is understood in the art, this communication subsystem 311 is modified so that it can support the operational needs of the handheld electronic communication device 300. The subsystem 311 includes a transmitter 314 and receiver 312 including the associated antenna or antennae (316, 318) as described above, local oscillators (LOs) 313, and a processing module 320 which in one possible embodiment is a digital signal processor (DSP) 320.

It is contemplated that communication by the handheld electronic communication device 300 with the wireless network 319 can be any type of communication that both the wireless network 319 and handheld electronic device 300 are enabled to transmit, receive and process. In general, these can be classified as voice and data. Voice communication is communication in which signals for audible sounds are transmitted by the handheld electronic communication device 300 through the communication network 319. Data generally refers to all other types of communication that the handheld electronic communication device 300 is capable of performing within the constraints of the wireless network 319.

To facilitate textual data entry into the handheld electronic device 300, an alphabetic keyboard 44a, 44b, 44c, 44d is provided. In illustrated embodiment of FIG. 3, a full alphabetic keyboard 332 is utilized in which there is one alphabetic letter per key. In this regard, the associated letters can be advantageously organized in QWERTY, QWERTZ, AZERTY or Dvorak layouts, among others, thereby capitalizing on certain users' familiarity with these special letter orders. The alphabetic keyboard 332 in the illustrated embodiment of FIG. 3 is in a full QWERTY keyboard layout. In order to stay within the bounds of the limited front surface area, however, each of the keys must be commensurately small when, for example, twenty-six keys must be provided in the instance of the English language.

Figure 5A:
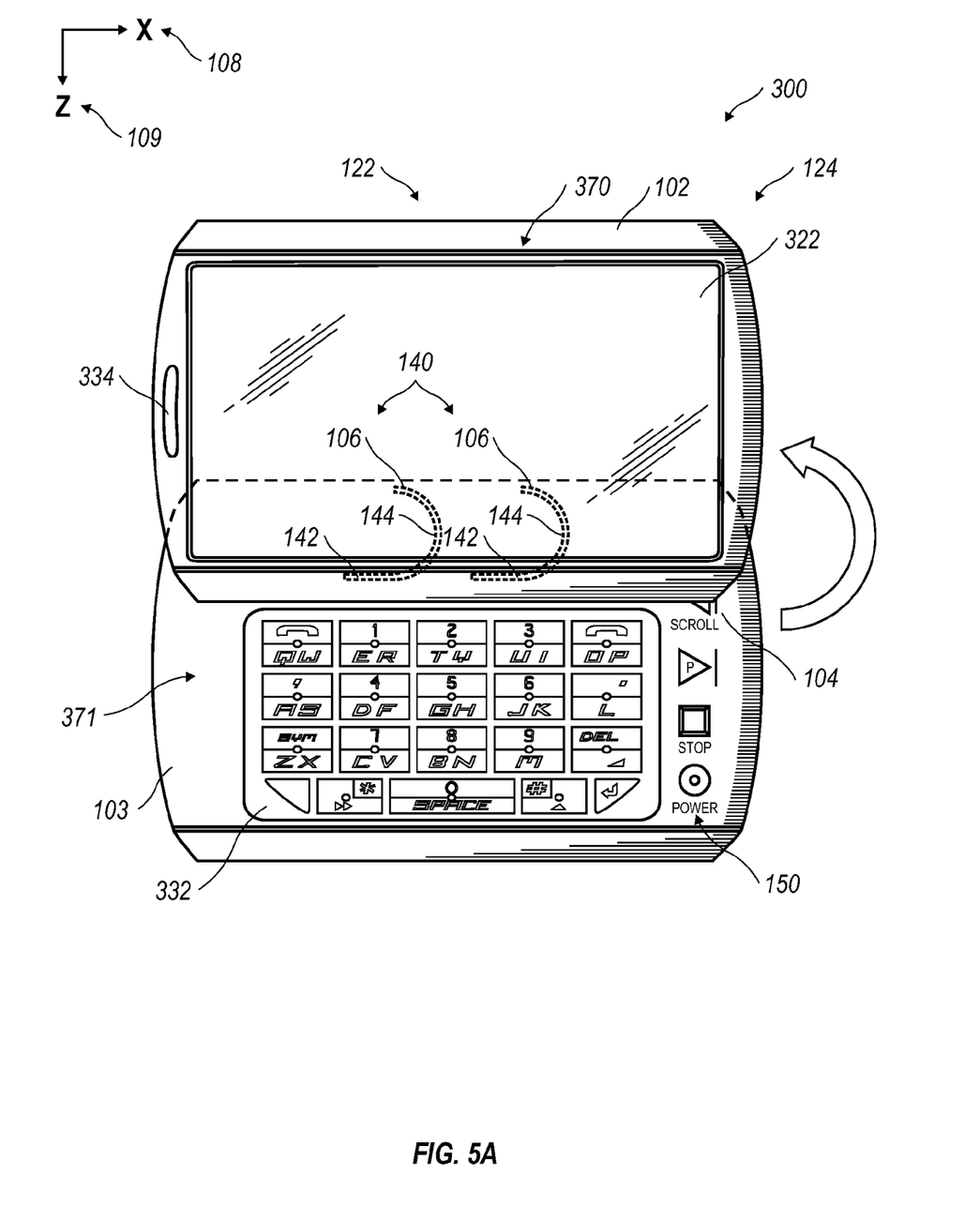
FIG. 5A is a front view of an exemplary handheld electronic communication device in an expanded configuration, revealing one possible keyboard layout.

An alternative configuration is to provide a reduced keyboard in which at least some of the keys have more than one letter associated therewith (see FIG. 5A for example). This means that fewer keys are required, which makes it possible for those fewer keys to each be larger than when a full keyboard is provided on a similarly dimensioned handheld electronic communication device 300. Some users will prefer the solution of the larger keys over the smaller ones, but it is necessary that program or hardware solutions be provided in order to discriminate which of the several associated letters the user intends based on a particular key actuation, a problem the full keyboard avoids. As shown in FIG. 5A, the reduced keyboard is a reduced QWERTY keyboard.

In at least one embodiment, the character discrimination is accomplished utilizing a disambiguation program included on the handheld electronic communication device 300. To accommodate program use on the handheld electronic communication device 300, a memory 324 and microprocessor 338 are provided within the body of the handheld unit for receiving, storing, processing, and outputting data during use. Thus, certain programs usually run on the microprocessor 338 of these types of handheld electronic communication devices 300 to determine or predict what letter or word has been intended by the user. Some examples of program include predictive text routines which typically include a disambiguation engine and/or predictive editor program. The program preferably also has the ability to recognize character letter sequences that are common to the particular language, such as, in the case of English, words ending in "ing." Such systems can also "learn" the typing style of the user making note of frequently used words to increase the predictive aspect of the program. Other types of predictive text computer programs may be utilized with the reduced keyboard arrangements described herein, without limitation. Some specific examples include the multi-tap method of character selection and "text on nine keys".

The keys of reduced keyboards are laid out with various arrangements of characters, commands and functions associated therewith. In regard to alphabetic characters, the different keyboard layouts identified below are selectively used based on a user's preference and familiarity; for example, the QWERTY keyboard layout is most often used by English speakers who have become accustomed to the key arrangement.

While in the illustrated embodiments the keyboard 338 is a physical keyboard, it should be further appreciated that the keyboard can be alternatively provided on a touch sensitive screen in either a reduced or full format. While the above illustrative embodiments only present a few of arrangements, it should be appreciated that other arrangements such as those described below and other common arrangements could be provided instead.

The handheld electronic communication device 300 is provided with a keyboard 332 on the keyboard panel 103 to enter text data. The keyboard 332 includes a plurality of keys that can be of a physical nature such as actuable buttons or they can be of a program nature, typically constituted by virtual representations of physical keys on a display screen 322 (referred to herein as "program keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an program or feature in use, initiating a command or function programmed by the user and other such commands and functions that are well known to those persons skilled in the art. Specific keys or other types of input devices can be used to navigate through the various programs and features thereof. Further, depending on the programs 358 or feature in use, specific keys can be enabled or disabled.

In the case of physical keys, all or a portion of the plurality of keys have one or more indicia, representing character(s), command(s), and/or functions(s), displayed at their top surface and/or on the surface of the area adjacent the respective key. In the instance where the indicia of a key's function is provided adjacent the key, the indicia can be printed on the device cover beside the key, or in the instance of keys located adjacent the display screen 322. Additionally, current indicia for the key may be temporarily shown nearby the key on the screen 322.

In the case of program keys, the indicia for the respective keys are shown on the display screen 322, which in one embodiment is enabled by touching the display screen 322 with, for example, a stylus to generate the character or activate the indicated command or function. Some examples of display screens 322 capable of detecting a touch include resistive, capacitive, projected capacitive, infrared and surface acoustic wave (SAW) touchscreens.

Physical and program keys can be combined in many different ways as can be appreciated by those skilled in the art. In one embodiment, physical and program keys are combined such that the plurality of enabled keys for a particular program or feature of the handheld electronic communication device 300 is shown on the display screen 322 in the same configuration as the physical keys. Using this configuration, the user can select the appropriate physical key corresponding to what is shown on the display screen 322. Thus, the desired character, command or function is obtained by depressing the physical key corresponding to the character, command or function displayed at a corresponding position on the display screen 322, rather than touching the display screen 322.

Figure 7A:
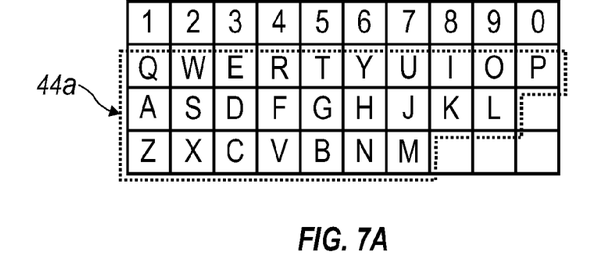
FIG. 7A illustrates an exemplary QWERTY keyboard layout.
Figure 7B:
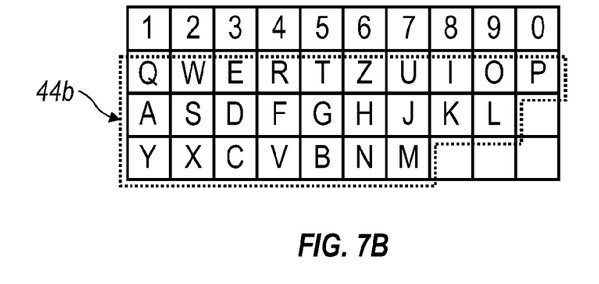
FIG. 7B illustrates an exemplary QWERTZ keyboard layout.
Figure 7C:
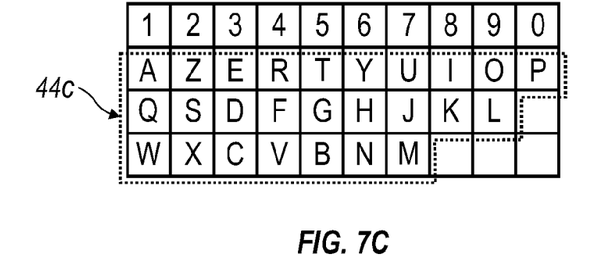
FIG. 7C illustrates an exemplary AZERTY keyboard layout.
Figure 7D:
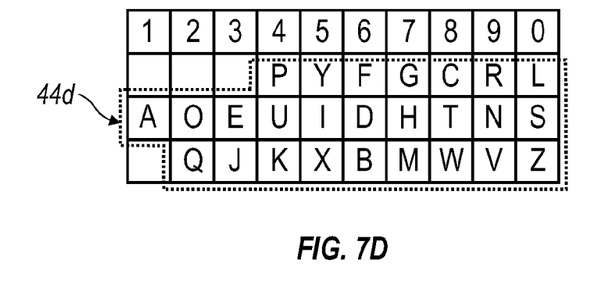
FIG. 7D illustrates an exemplary Dvorak keyboard layout.

The various characters, commands and functions associated with keyboard typing in general are traditionally arranged using various conventions. The most common of these in the United States, for instance, is the QWERTY keyboard layout. Others include the QWERTZ, AZERTY, and Dvorak keyboard configurations. The QWERTY keyboard layout is the standard English-language alphabetic key arrangement 44a shown in FIG. 7A. The QWERTZ keyboard layout is normally used in German-speaking regions; this alphabetic key arrangement 44b is shown in FIG. 7B. The AZERTY keyboard layout 44c is normally used in French-speaking regions and is shown in FIG. 7C. The Dvorak keyboard layout was designed to allow typists to type faster; this alphabetic key arrangement 44d is shown in FIG. 7D.

Figure 8:
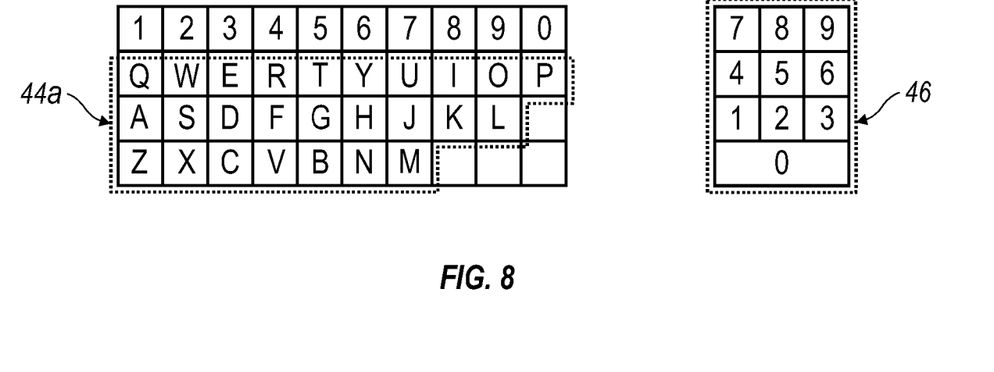
FIG. 8 illustrates a QWERTY keyboard layout paired with a traditional ten-key keyboard.

Alphabetic key arrangements are often presented along with numeric key arrangements. Typically, the numbers 1-9 and 0 are positioned in the row above the alphabetic keys 44a-d, as shown in FIG. 7A-D. Alternatively, the numbers share keys with the alphabetic characters, such as the top row of the QWERTY keyboard. Yet another exemplary numeric key arrangement is shown in FIG. 8, where a "ten-key" style numeric keypad 46 is provided on a separate set of keys that is spaced from the alphabetic/numeric key arrangement 44a. The ten-key styled numeric keypad 46 includes the numbers "7", "8", "9" arranged in a top row, "4", "5", "6" arranged in a second row, "1", "2", "3" arranged in a third row, and "0" in a bottom row. Further, a numeric phone key arrangement 42 is exemplarily illustrated in FIG. 9.

Figure 9:
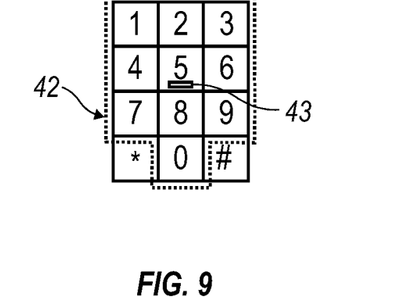
FIG. 9 illustrates ten digits comprising the numerals 0-9 arranged in a traditional, ITU Standard E.161 numeric telephone keypad layout, including the * and # flanking the zero.

As shown in FIG. 9, the numeric phone key arrangement 42 may also utilize a surface treatment on the surface of the center "5" key. This surface treatment is configured such that the top surface of the key is distinctive from the surface of other keys. Preferably the surface treatment is in the form of a raised bump or recessed dimple 43. Alternatively, raised bumps may be positioned on the housing around the "5" key and do not necessarily have to be positioned directly on the key.

It is desirable for handheld electronic communication devices 300 to include a combined text-entry keyboard and a telephony keyboard. Examples of such handheld electronic communication devices 300 include mobile stations, cellular telephones, wireless personal digital assistants (PDAs), two-way paging devices, and others. Various keyboards are used with such devices and can be termed a full keyboard, a reduced keyboard, or phone key pad.

In embodiments of a handheld electronic communication device 300 having a full keyboard, the alphabetic characters are singly associated with the plurality of physical keys. Thus, in an English-language keyboard of this configuration, there are at least 26 keys in the plurality so that there is at least one key for each letter.

Figure 10:
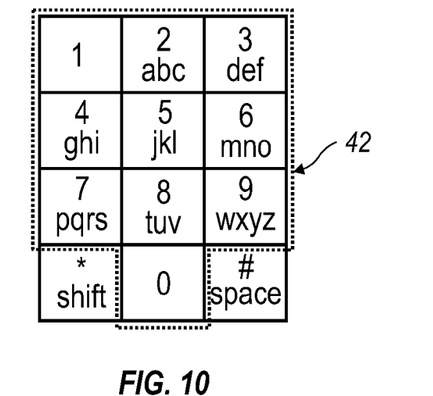
FIG. 10 illustrates a traditional or standard phone key arrangement or layout according to the ITU Standard E.161 including both numerals and letters.

FIGS. 9 and 10 both feature numeric keys arranged according to the ITU Standard E.161 form. In addition, FIG. 10 also incorporates alphabetic characters according to the ITU Standard E.161 layout as well.

While the above components are present on at least some of the handheld electronic communication devices described below, other devices may include only a portion of the above described components. Furthermore, other components may be included to allow the device to function as desired. For example, a location positioning device might be included and some devices may implement a cursor navigation tool. In yet other embodiments, a portion of the keyboard 332 may be omitted or the wireless communication components may be omitted.

Figure 1B:
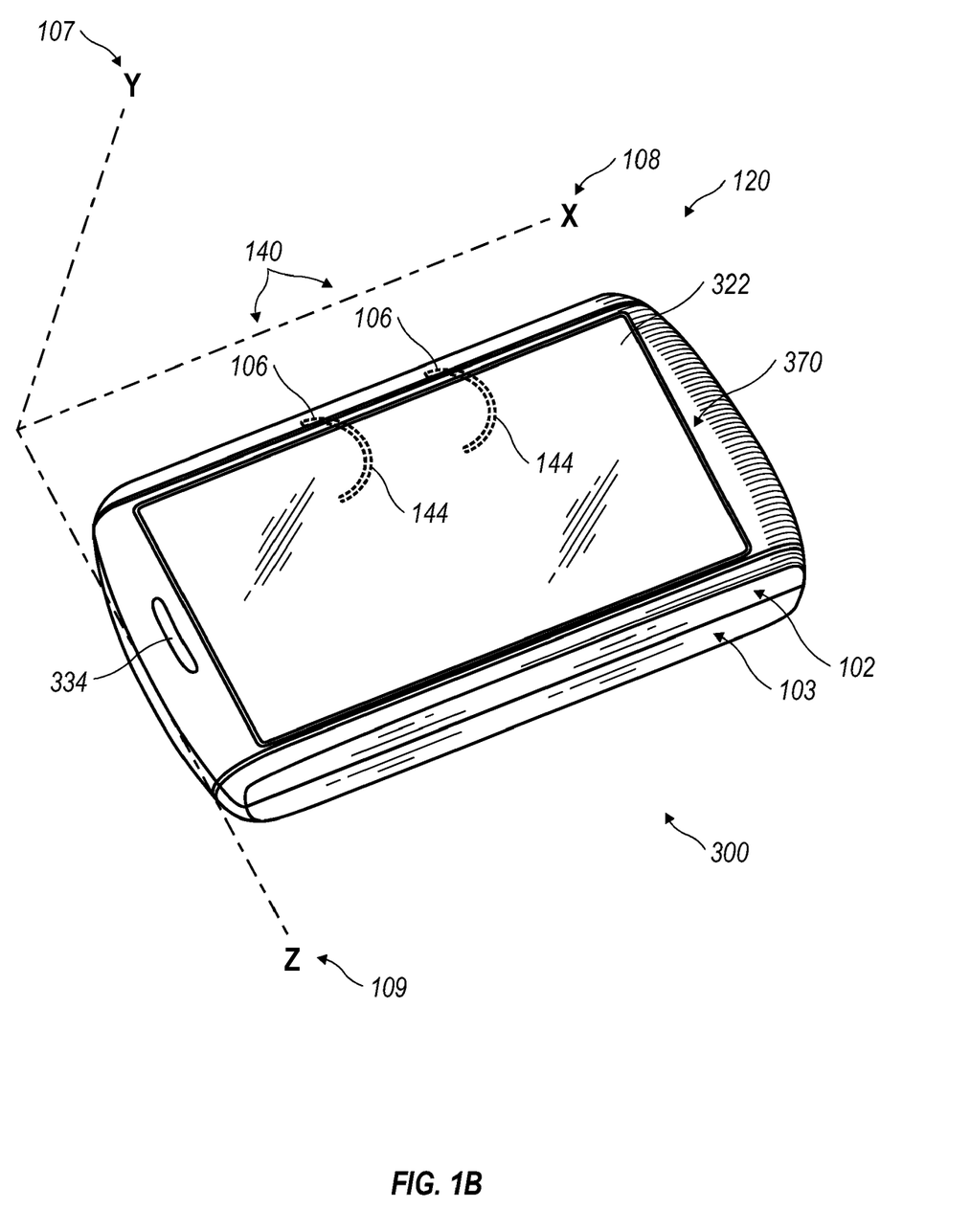
FIG. 1B illustrates perspective view of an exemplary handheld electronic communication device accompanied by accompanied by x, y and z axes.
Figure 2A:
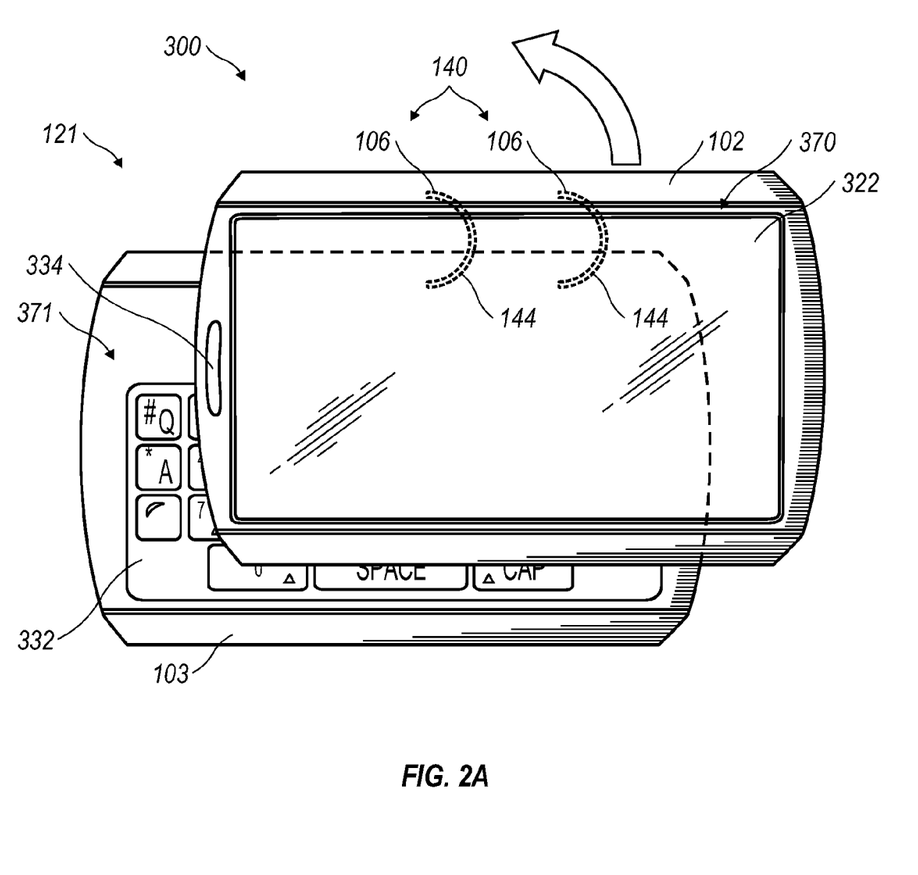
FIG. 2A is a front view of an exemplary handheld electronic communication device in transition from a compact configuration to an expanded configuration.
Figure 2B:
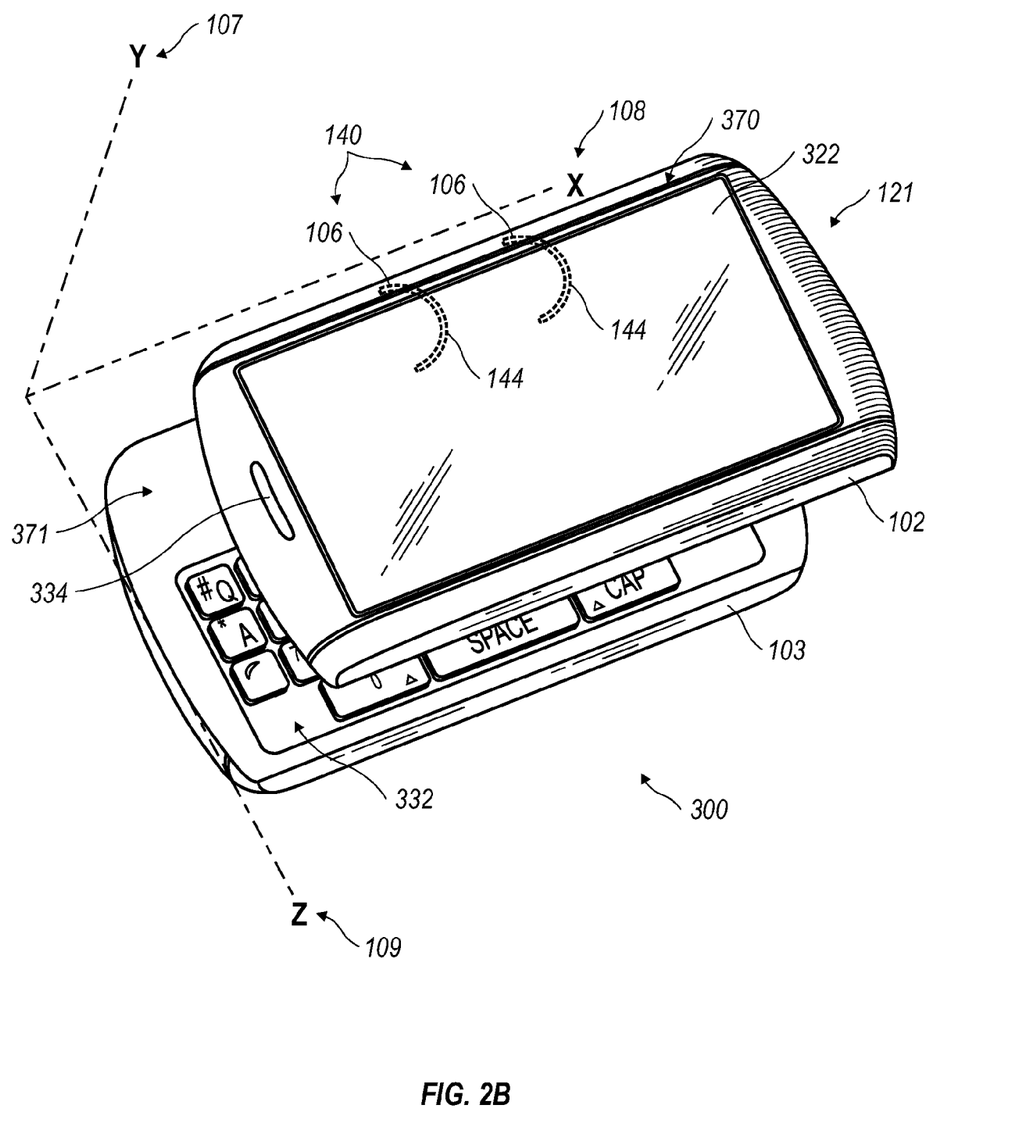
FIG. 2B illustrates a perspective view of an exemplary handheld electronic communication device in transition from a compact configuration to an expanded configuration accompanied by x, y and z axes, with the keyboard panel resting in the x-z plane.

In at least one embodiment, the handheld electronic communication device 300 can be arranged such that it is transitionable between at least a compact configuration 120 and an expanded configuration 122. An exemplary illustration of the compact configuration 120 is shown in FIGS. 1A and 1B, while FIGS. 2A and 2B illustrate the handheld electronic communication device transitioning from the compact configuration 120 to the expanded configuration 122. As illustrated in at least FIGS. 2A and 2B, a display panel 102 is interconnected to a keyboard panel 103 by at least one interconnection 140.

In the illustrated compact configuration 120 of FIGS. 1A and 1B, a handheld electronic communication device 300, in which a display panel 102 is overlaid on and in substantial registration with the keyboard panel 103 is shown. In the illustrated embodiments, the display panel 102 completely conceals the front face 371 of the keyboard panel 103, while the handheld electronic communication device 300 is in the compact configuration 120. In other embodiments, less than all of the front face 371 of the keyboard panel 103 is concealed beneath the display panel 102 of the handheld electronic communication device 300 in the compact configuration 120.

Furthermore, the display panel 102 houses a display screen 322 which can be a touch screen. When the display screen 322 is a touch screen navigational control over the displayed items on the display screen 322 can be effectuated using a digit (finger or thumb) of the operator, a stylus, or other similar object which can be used to direct navigation. When a touch screen is so provided the items displayed on the screen can be selected via operator actuation, selection, gesturing of some combination there of on the front surface of the display screen 322. In other embodiments, the operator does not have to contact the display screen 322 in order to make the selection. Additionally, the display screen 322 can be configured such that it is capable of displaying items on the screen in both landscape and portrait orientations that is either parallel to the lengthwise direction (longest side) or perpendicular to the lengthwise direction. In other embodiments, the display panel 102 can be provided with a cursor navigation tool for controlling cursor navigation on the display screen 322.

Other components may be located on the display panel 322. For example, FIG. 1A shows a port for a speaker 334 on the leftward side of a front face 370 between the leftmost edge of the display panel 102 and the leftmost edge of the display screen 322. In other embodiments, the speaker 334 could be located in another position. Additionally, a port for a microphone 336 could be located on the front face 370 of the display panel 102 (not shown). As mentioned above, a navigational tool could likewise be located on the front face 370 of the display panel 102.

Also shown in FIG. 1A is at least one interconnection 140, which is configured to maintain the display panel 102 and keyboard panel 103 in substantial parallel orientation to each other. In at least one embodiment, the interconnection 140 comprises at least one track 106. As illustrated in FIG. 1A, the interconnection 140 comprises two tracks 106. The tracks 106 are exemplary only, and other possible configurations of the interconnections 140 are possible. Similarly, FIG. 1B shows a perspective view of the exemplary handheld communication as in FIG. 1A, along with illustrated x, y, and z axes. In one embodiment, at least one track 106 extends across less than fifty percent of a front face 371 of the keyboard panel 103 or back face of the display panel 102 in a substantially z-direction 109. In another embodiment, the at least one track extends across approximately fifty percent of a front face 371 of the keyboard panel 103 or back face of the display panel 102 in a substantially z-direction 109.

Figure 1C:
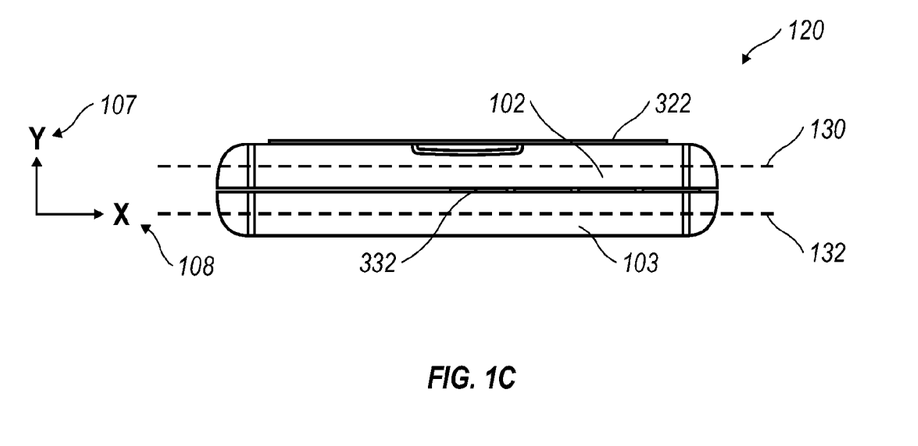
FIG. 1C is a left-side view of an exemplary handheld electronic communication device with a display panel in substantial registration with a keyboard panel.

FIG. 1C illustrates a left side view of the handheld electronic communication device 300 in the compact configuration 120. As illustrated the display panel 102 can define a first central plane 130 and is interconnected to the keyboard panel 103 defining a second central plane 132. The display panel 102 and keyboard panel 103 can be interconnected using one of the above described interconnections 140 or the like. In the compact configuration 120 as illustrated in FIG. 1C, the display panel 102 can be overlaid on, and in substantial registration with the keyboard panel 103. As illustrated, the first central plane 130 is located in an x-z plane located above the x-z plane that the second central plane 132 is located in. In the illustrated embodiments, the x, y, and z axes have been arranged such that the y axis is orthogonal to the front face 370 of the display panel.

Figure 2C:
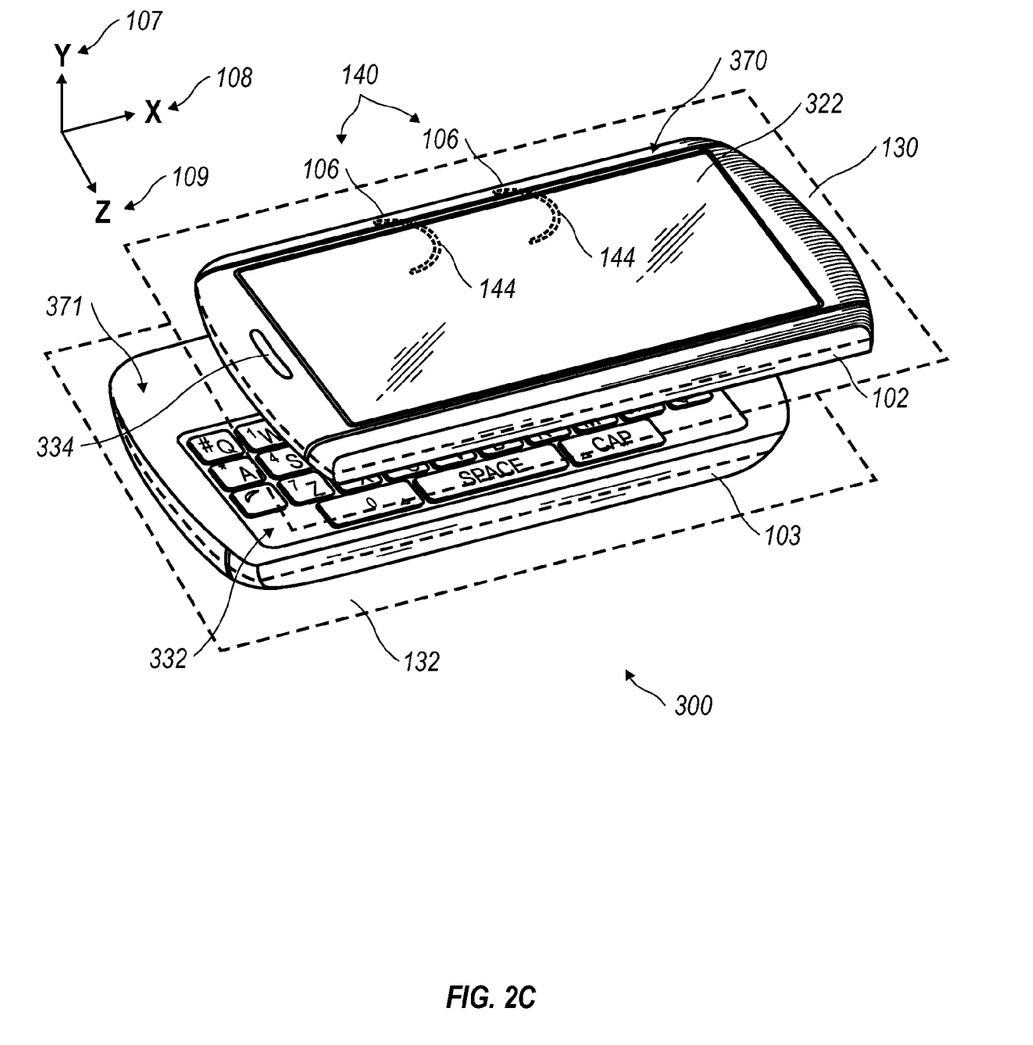
FIG. 2C illustrates a perspective view of an exemplary handheld electronic communication device further from FIG. 2B in rotation-free transition from a compact configuration to an expanded configuration.

The above described interconnections 140 can allow the display panel 102 and the coupled keyboard panel 103 to maintain the first central plane 130 and the second central plane 132 in a substantial parallel orientation to each other during the transition between the compact configuration and the expanded configuration, such as the one illustrated in FIG. 2C. As illustrated in FIGS. 2A-C, the interconnection 140 can be further configured so that during transition between the compact configuration 120 and the expanded configuration 122, the first central plane 130 and second central plane 132 undergo rotation-free, x-direction 108 and z-direction 109 motion relative one another. When the interconnection 140 is one or more tracks 106, the one or more tracks 106 can have arcuate portions 144 along which an insert slides during transition between the compact configuration 120 and expanded configuration 122. When such a track 106 is provided, it enables the display panel 102 to undergo rotation free transition relative to the keyboard panel 103 from the compact configuration 120 to the expanded configuration 122. While a pair of tracks 106 are shown in the illustration, in at least one embodiment only a single track may be included. Additionally, other interconnections 140, which can achieve the same function, are also considered within the scope of this disclosure.

During the transition from the compact configuration 120 to the expanded configuration 122, the motion of the display panel 102 relative to the keyboard panel 103 can be described in relation to the x-axis and z-axis. For example, FIG. 2B shows the display panel 102 moving upward in a negative z-direction 109 and rightward in a positive x-direction 108. This transitional state of the handheld electronic communication device illustrates the rotation-free motion of the display panel 102 relative to the keyboard panel 103 as mentioned above.

Once the display panel 102 has completed its transition from the compact configuration 120 to the expanded configuration 122, the display panel 102 is offset above the keyboard panel 103, as illustrated in FIG. 3. In this configuration the first central plane (not shown) and second central plane (not shown) maintain the substantial parallel orientation to each other in this expanded configuration 122. When the handheld electronic communication device 300 is configured in the expanded configuration 122, the location of the display panel 102 offset above the keyboard panel 103 reveals a keyboard 332. Additionally, a cursor navigation tool such as trackball, joystick, navigation pad, or the like could be provided on the front face 371 of the keyboard panel 103.

Furthermore, in at least one embodiment, the handheld electronic communication device 300 can include an interconnection 140 which allows for a translated configuration 124, such as the one illustrated in FIGS. 4A-B, and 5A-B. When the handheld electronic communication device 300 is in the translated configuration 124, the display panel 102 is shifted exclusively sideways relative the keyboard panel 103 and at least one input key 104 on the keyboard panel 103 is exposed for actuation. In at least one embodiment a column of keys 150 which includes the at least one input key 104 on the keyboard panel 103 is exposed for actuation in the translated configuration 124. Additionally, a navigation tool can be provided in this column of keys 150 (not shown). In one embodiment, only a single column of keys 150 is provided on the keyboard panel 103. As illustrated, the single column of keys comprises media player control keys, which allow for watching videos, playing audio files and the like. Other similar buttons can be provided based upon the intended use of the handheld electronic communication device 300.

In one embodiment, interconnection 140 comprises one or more tracks 106 similar to the ones described above. For example at least one track 106 has an arcuate portion 144 along which an insert can slide during transition between the compact configuration 120 and the expanded configuration 122. Additionally, the track can further comprise a straight portion 142 along which the insert slides during transition between the compact configuration 120 and the translated configuration 124. In at least one embodiment, the straight portion 142 of the at least one track 106 has a length greater than a radius of the arcuate portion 144 of the track 106 (longer straight portion 142 not illustrated). However, in the embodiment shown in FIGS. 5A and 5B, the straight portion 142 of the at least one track 106 has a length approximately equal to a radius of the arcuate portion 144 of the track 106. As illustrated the straight portion 142 of the track 106 extends in a direction substantially parallel to the x-axis. In the embodiments pictured in FIGS. 1A, 1B, 2A, 2B, 2C and FIG. 3, at least one track 106 extends across less than fifty percent of a front face 371 of the keyboard panel 103 or back face of the display panel 102 in a direction along the z-axis. In another embodiment, the at least one track extends across approximately fifty percent of a front face 371 of the keyboard panel 103 or back face of the display panel 102 in a direction along the z-axis 109. While the above has been described in relation to at least one track 106, in a particular embodiment a pair of tracks 106 are provided on the handheld electronic communication device 300. It should be apparent to those skilled in the art that more than two tracks 106 are possible. It will also be apparent to one skilled in the art that the connector or connectors need not be tracks 106, and that other connecting mechanisms are possible, such as hinges, rotating hinges, springs and the like.

Figure 4A:
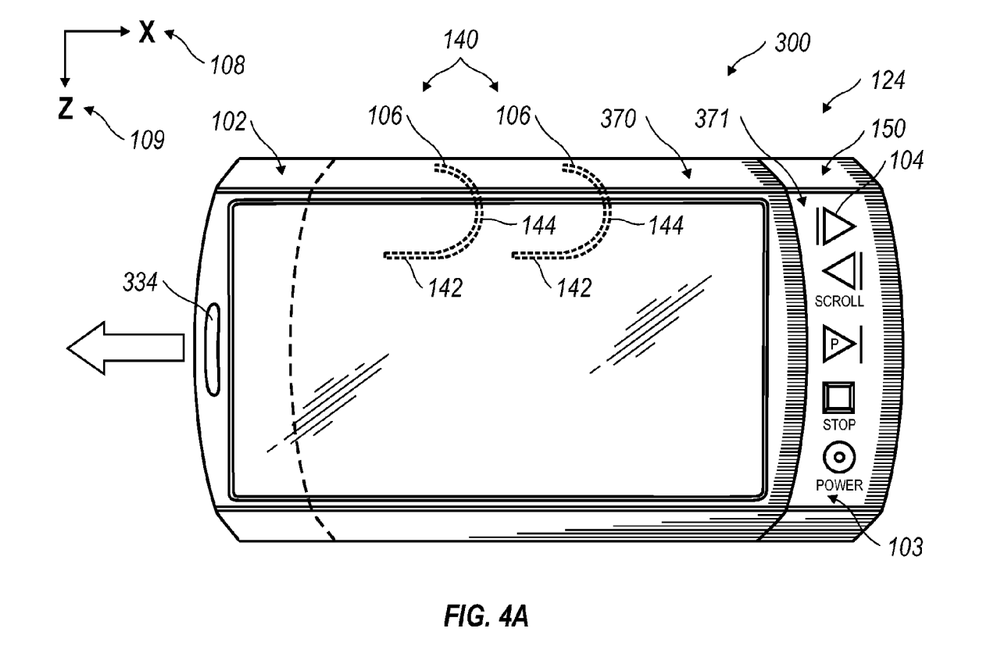
FIG. 4A illustrates a front view of an exemplary handheld electronic communication device with an oblong display panel sliding leftward in a negative x-direction.

FIG. 4A shows a front view of the display panel 102 moving in a negative x-direction 108 along the straight portion 142 of the one or more tracks 106. Such a possible configuration may be desirable when the electronic handheld communication device 300 is to be used primarily as a multimedia player. Thus only a portion of the key board panel 103 is exposed, making a column of navigation keys 104 actuable.

Figure 4B:
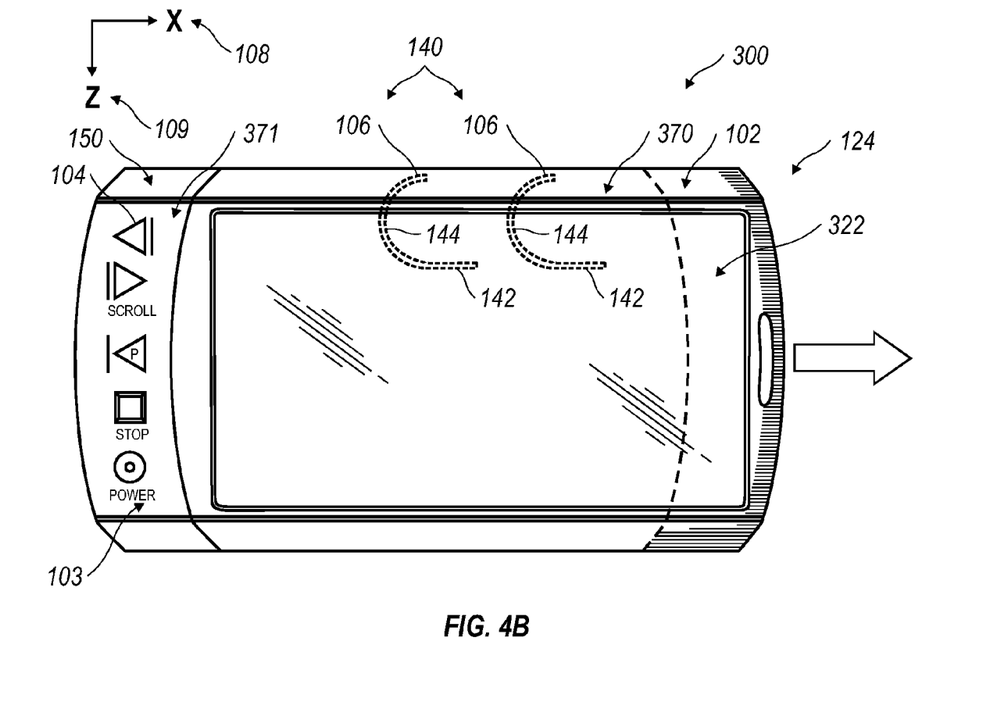
FIG. 4B illustrates a front view of an exemplary handheld electronic communication device with an oblong display panel sliding rightward in a positive x-direction.

FIG. 4B illustrates a configuration similar to that in FIG. 4A, except the display panel 102 is slid rightward in a positive x-direction 108 along the straight portion 142 of the tracks 106. A column of navigation keys 104 is exposed for actuation.

FIG. 5A illustrates an expanded configuration 122 of the handheld electronic communication device 300 wherein the keyboard 332 is fully exposed for actuation. The navigation keys 104 on the rightward side are partly exposed in this example. In the exemplary embodiment illustrated in FIG. 5A, the keyboard is of the type in which some or all of the keys can be used to select more than one symbol for data entry.

Figure 5B:
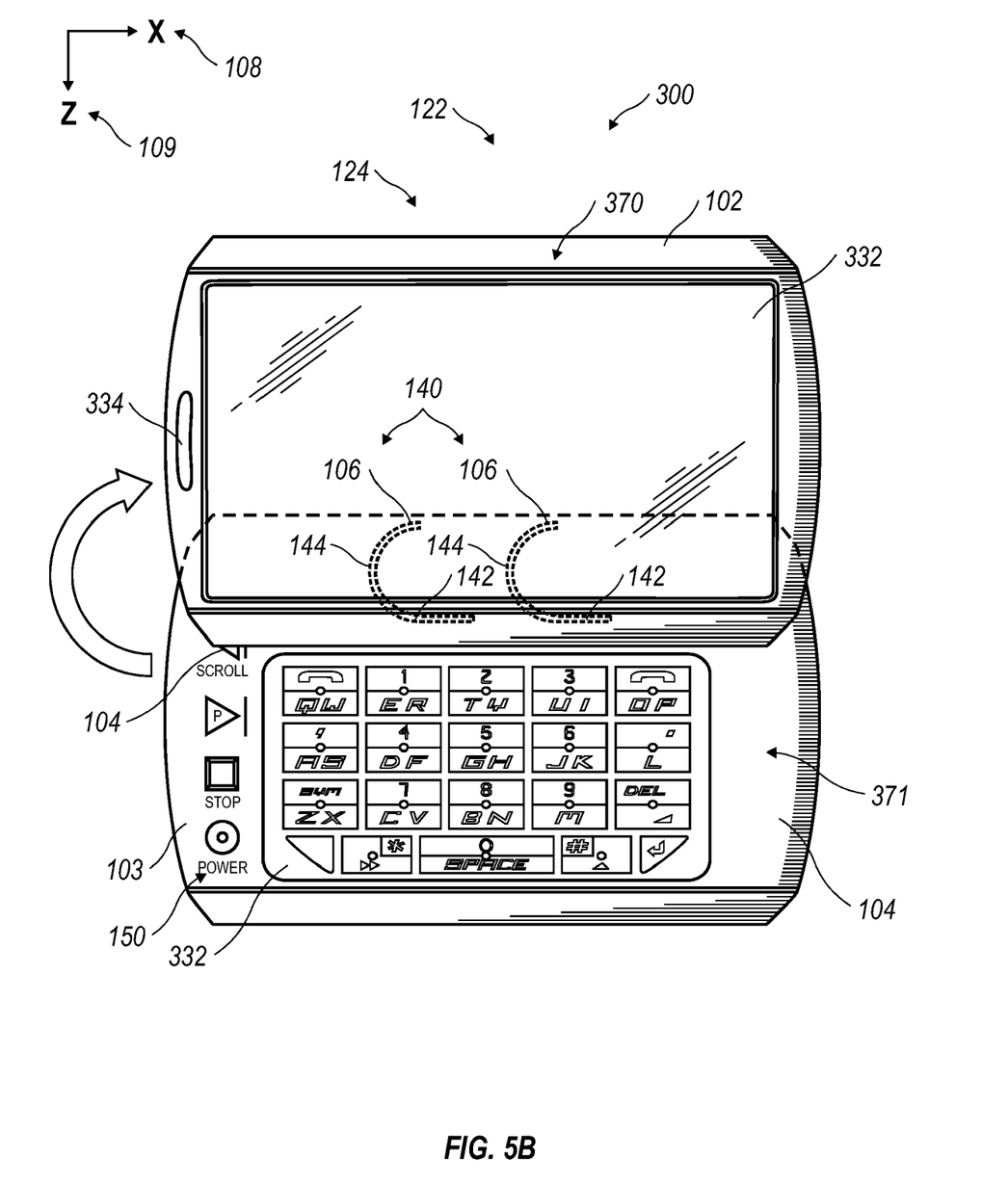
FIG. 5B illustrates a front view of an exemplary handheld electronic communication device in a leftward transition from a compact configuration to an expanded configuration.

FIG. 5B illustrates an alternate expanded configuration 122 of the handheld electronic communication device 300 wherein the keyboard 332 is fully exposed for actuation. The straight portion 144 of the tracks 106 extends rightward in the positive x-direction 108. The navigation keys 104 on the leftward side are partly exposed in this example. In the exemplary embodiment illustrated in FIG. 5B, the keyboard is of the type in which some or all of the keys can be used to select more than one symbol for data entry.

When the operator desires to use the expanded configuration 122 of the handheld electronic communication device 300, the operator shifts the display panel 102 in a negative z-direction 109 until the device 300 attains an expanded configuration 122. As exemplarily demonstrated in FIG. 2A, the respective sides or edges of the panels 102, 103 remain parallel throughout the transformation. In a given expanded configuration 122, FIGS. 3 and 5A for example, some or all of the actuation keys may be exposed for use, depending on where they are placed. When the operator desires to store the device 300 in a compact configuration, he or she slides the display panel in the opposite direction, a positive z-direction 109, along the interconnection 140, which may be a track or tracks 106 as shown, but may also comprise a different connecting arrangement.

As illustrated herein, the display panel 102 and the keyboard panel are each oblong shaped with a long axis in a z-direction 109 and in each of the compact configuration 122, translated configuration 124, and expanded configuration 122. As will be obvious to one skilled in the art, the display panel 102 and keyboard panel 103 could be configured in other ways while remaining within the spirit of this disclosure.

Exemplary embodiments have been described hereinabove regarding both handheld electronic communication devices 300, as well as the communication networks 319 within which they cooperate. Again, it should be appreciated that the focus of the present disclosure is providing a device that is capable of transitioning from a compact configuration 120 to an expanded configuration 122, and optionally a translated configuration 124. Various modifications to the disclosed embodiments, and departures therefrom, will occur to those having skill in the art. The subject matter that is intended to be within the spirit of this disclosure is set forth in the following claims.

What is claimed is:

1. A handheld electronic communication device transitionable between at least a compact configuration and an expanded configuration, said device comprising:

a display panel defining a first central plane and interconnected to a keyboard panel defining a second central plane, wherein said display panel is overlaid on, and in substantial registration with, said keyboard panel in the compact configuration and said display panel is offset above said keyboard panel in the expanded configuration;

said display panel coupled to said keyboard panel by at least one interconnection configured to maintain said first central plane and second central plane in substantial parallel orientation to each other in the compact configuration and expanded configurations and during transition between the compact configuration and the expanded configuration in which the first central plane and second central plane undergo both x-direction and z-direction motion relative one another;

wherein said at least one interconnection comprises a pair of tracks, each comprising an arcuate portion along which a respective insert slides during transition between the compact configuration and expanded configuration, said pair of tracks disposed on a front face of the keyboard panel;

wherein said at least one interconnection is further configured so that during transition between the compact configuration and expanded configuration the first central plane and second central plane undergo rotation-free, x-direction and z-direction motion relative one another;

wherein said pair of tracks further comprises a straight portion along which the insert slides during transition between the compact configuration and a translated configuration, said display panel is shifted exclusively sideways relative the keyboard panel in the translated configuration whereby at least one input key on the keyboard panel is exposed for actuation; and wherein said at least one interconnection is further configured to expose a text-entry keyboard on the keyboard panel in the expanded configuration.

2. The handheld electronic communication device as recited in claim 1, wherein a column of keys, including the at least one input key on the keyboard panel is exposed for actuation in the translated configuration.

3. The handheld electronic communication device as recited in claim 1, wherein a single column of keys, including the at least one input key on the keyboard panel is exposed for actuation in the translated configuration.

4. The handheld electronic communication device as recited in claim 3, wherein the single column of keys comprises media player control keys.

5. The handheld electronic communication device as recited in claim 1, wherein said pair of tracks extends across less than fifty percent of the front face of the keyboard panel in the x-direction.

6. The handheld electronic communication device as recited in claim 1, wherein said pair of tracks extends across approximately fifty percent of the front face of the keyboard panel in the x-direction.

7. The handheld electronic communication device as recited in claim 1, wherein the straight portion of the pair of tracks has a length greater than a radius of the arcuate portion of the track.

8. The handheld electronic communication device as recited in claim 1, wherein the straight portion of the pair of tracks has a length approximately equal to a radius of the arcuate portion of the track.

9. The handheld electronic communication device as recited in claim 1, wherein the straight portion of the pair of tracks extends in the x-direction.

10. The handheld electronic communication device as recited in claim 1, wherein the display panel and the keyboard panel are each oblong shaped with a long axis in the x-direction in each of the compact, translated and expanded configurations.

11. The handheld electronic communication device as recited in claim 1, wherein said keyboard comprises a plurality of keys with which alphabetic letters are associated, wherein at least a portion of the plurality of keys have multiple letters associated therewith and said alphabetic letters are arranged in a QWERTY layout.

12. The handheld electronic communication device as recited in claim 1, wherein said keyboard comprises a plurality of keys with which alphabetic letters are associated, one letter per key and said alphabetic letters are arranged in a QWERTY layout.

13. A handheld electronic communication device transitionable between at least a compact configuration and an expanded configuration, said device comprising:

a display panel defining a first central plane and interconnected to a keyboard panel defining a second central plane, wherein said display panel is overlaid on, and in substantial registration with, said keyboard panel in the compact configuration and said display panel is offset above said keyboard panel in the expanded configuration;

said display panel coupled to said keyboard panel by a pair of tracks configured to maintain said first central plane and second central plane in substantial parallel orientation to each other in the compact configuration and expanded configurations and during transition between the compact configuration and the expanded configuration in which the first central plane and second central plane undergo both x-direction and z-direction motion relative one another;

each track of said pair of tracks comprises:
an arcuate portion along which a respective insert slides during transition between the compact configuration and expanded configuration; and
a straight portion along which the insert slides during transition between the compact configuration and a translated configuration; and wherein said pair of tracks are disposed on a front face of the keyboard panel and said pair of tracks are further configured so that during transition between the compact configuration and expanded configuration the first central plane and second central plane undergo rotation-free, x-direction and z-direction motion relative one another.

14. The handheld communication device as recited in claim 13, wherein said pair of tracks are further configured to expose a text-entry keyboard on the keyboard panel in the expanded configuration.

15. The handheld communication device as recited in claim 13, further comprising a single column of media player control keys exposed on the keyboard panel in the translated configuration.

16. The handheld communication device as recited in claim 13, further comprising a cursor navigation tool on the keyboard panel.

17. The handheld communication device as recited in claim 13, wherein said keyboard comprises a plurality of keys with which alphabetic letters arranged in a QWERTY layout are associated therewith.

* * * * *